TURNER & STUROC.
Thrashing Machine.
No. 10,495.                                              Patented Feb. 7, 1854.
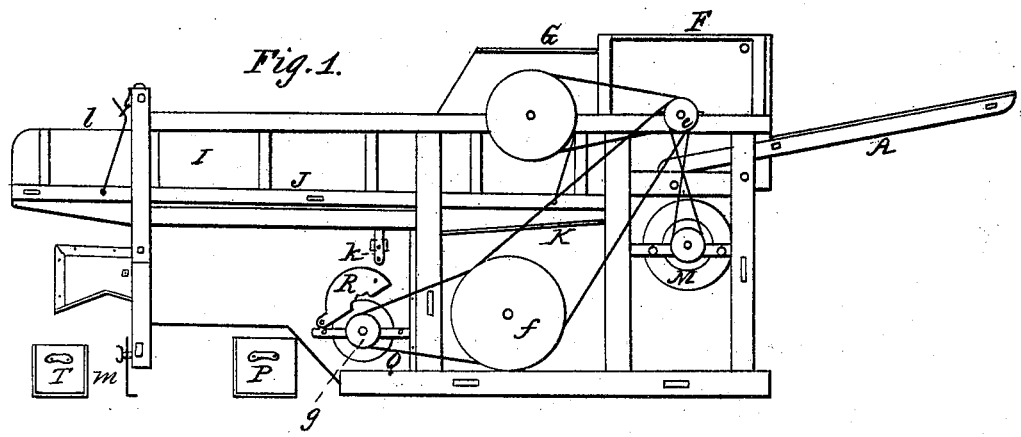
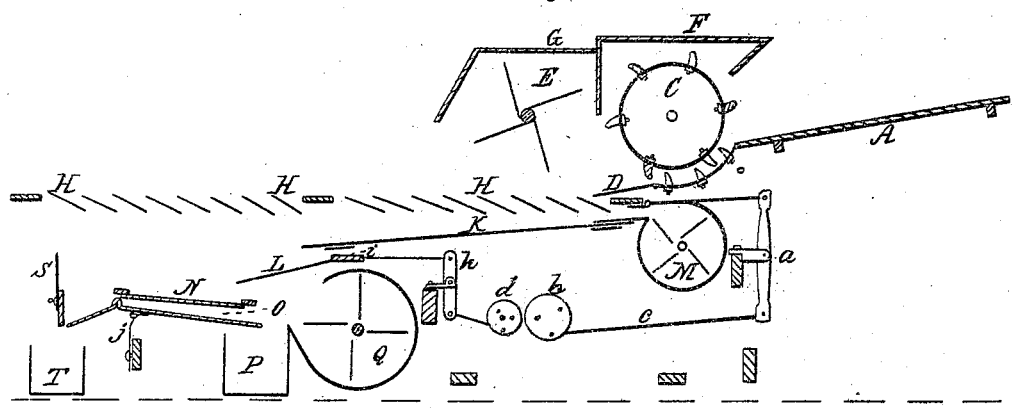
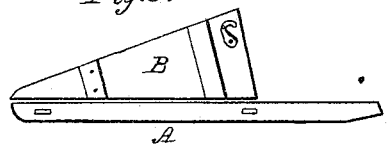  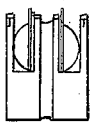  

UNITED STATES PATENT OFFICE.

JOSIAH TURNER AND W. C. STUROC, OF SUNAPEE, NEW HAMPSHIRE.

WINNOWER.

Specification of Letters Patent No. 10,495, dated February 7, 1854.

*To all whom it may concern:*

Be it known that we, JOSIAH TURNER and W. C. STUROC, both of Sunapee, in the county of Sullivan and State of New Hampshire, have jointly invented a new and improved combination of machinery for separating and winnowing (or, as it is technically called, "cleaning") grain from the straw and chaff as it passes from the thresher; and we do hereby declare that the following as a full and clear description of the said invention; reference being had to the drawings annexed as part of this specification.

The nature of our invention consists in the application of an oscillating cradle of slanting slat work—with which we combine a blower—to separate the grain from the straw and chaff, when it has left the thresher; and to enable others skilled in the art to make and use our invention we will proceed to describe its construction and operation.

The different representations of the same parts are marked, in the different figures, by identical letters.

Figure 1, is a whole-length elevation of the lefthand or driving side of the machine. Fig. 2, is a longitudinal central section, showing the center of every through part of the machine.

"A" is the frame of the feed-table, Figs. 1 and 3. "B," Fig. 3, is the folding side of the table, with its fastenings. The straw is fed in on the flat of this table, as seen in Fig. 2 at "A," at the elevated end of which the operator stands. It then passes through between the teeth of cylinder "C," Fig. 2, and its corresponding serrated concave. It is then thrown with considerable force over the iron plate or chain "D," Fig. 2, and, partaking of the motion of the cylinder, is projected upward against the revolving fender "E," Fig. 2, which by its moderate revolutions drops the grain upon the slats "H, H, H," and through the openings between which it is shaken by the vacillating motion of the cradle, the side of which is marked "I," Fig. 1, and the face of which is formed of said slats. The "slats" are tenoned into the side-rail of the cradle, marked "J," Fig. 1. The grain having left the slats, drops upon the bottom of the cradle, marked "K," Figs. 1 and 2, and is sifted along the incline of said bottom to the apron of the hopper, marked "L," Fig. 2. The separated straw in the meantime is being jerked by each successive motion of the cradle toward the extreme end of the machine, seen at the lefthand side of Figs. 1 and 2. Immediately under the before named cylinder is placed a small blower "M," Figs. 1 and 2, over the spout of which the end of the cradle chamber plays, so that the wind is directed up between the slats and along bottom "K," Fig. 2. The use of this blower we will briefly explain. It is desirable to send the separated grain on to the cleaning sieves as free as possible from light straws and chaff, and that object we attain by means of this blower, which makes wind sufficient to keep such light culch in the straw on the slats, and at the same time lightly to fan the grain that is thrown in toward the bottom of the cradle, by this means making the final cleaning an easy matter, because the greater part of the trash, which in ordinary machines falls on the cleaning sieves, is by this device prevented from ever getting there, but instead passes off in the straw. The blower "M" assists by its wind in keeping the straw buoyant upon the face of the slats, and also serves the purpose of partially commencing the cleaning process on the grain that has fallen upon bottom "K." It is driven by a cross belt from the left hand end of the cylinder, seen in Fig. 1. The grain having reached the apron of hopper "L," Fig. 2, is then shaken upon sieve "N," same figure, and being sifted through said sieve, falls upon bottom of hopper "O," Fig. 2, and is from thence, shaken into box "P," Figs. 1 and 2, finally cleaned. The wind which effects the final cleaning of the grain, is generated by mill "Q," Figs. 1 and 2, and this wind can be regulated by shutters "R," one of which is seen in Fig. 1. That part of the grain which is so light as to be blown over the highest part of sieve "N," strikes a slide-board, marked "S," Fig. 2, which board can be fastened at any particular height by means of a screw passing through a mortise in its center. The light grain or "tailings" which reaches this board drops through an opening under the screen of said slide-board into tailing box "T," Figs. 1 and 2, which box will be filled perhaps once for three times of the grain box, depending on the quality and kind of grain. Its contents may be taken up and thrown upon the top of slats "H, H, H," Fig. 2, or it may be put through from the feed-table.

The shaded blocks seen in Fig. 2 are center cuts of the transverse rails of the machine, corresponding to the tenons seen in Fig. 1.

Fig. 4 is a heart-cut of the ratchet pulley, to which the power-belt is applied, which gives motion to the cylinder and all the other parts of the machine. As the right-hand side of the machine is precisely similar in its frame-work to the left, it was deemed unnecessary to represent that side merely for the purpose of showing the position of this ratchet pulley. This pulley is constructed as seen in Fig. 4, with straight dogs dropped into apertures or mortises in the pulley, against the outer side of which dogs an arc spring is placed, pressing the dogs toward the center and causing them to hug the ratchet collar on the cylinder arbor. The object of this pulley is to prevent accidents, by the sudden stoppage of the driving power, which would naturally occur if this pulley were a fixture on the thresher arbor. We therefore adopt a notched or ratchet collar on said arbor, and spring-dogs in the pulley, as shown in Figs. 4 and 5, or some equivalent device to permit of the thresher's running until its momentum becomes exhausted, while at the same time the power belt is allowed to remain undisturbed in its place on the speed wheel and ratchet pulley. This device answers all the purposes in this case of an additional or loose pulley such as we find in common use in all kinds of machinery. It may be made or iron or hard wood, and Fig. 5, represents a plate of iron the slots of which are dropped over the points of the dogs, the shoulders of said dogs being flush with the end of the pulley. This plate is fastened on by two screws, seen in Fig. 5.

We will now briefly describe the propulsion of the various parts of the machine.

The lever arm "$a$," Fig. 2, is made to vacillate by the revolution of a shaft "$b$," a circular crank on the inner end of which is seen in Fig. 2, connected to the arm "$a$" by a rod "$c$." Arm "$a$" has its fulcrum bolted to a transverse rail immediately behind blower "M," Fig. 2. The upper end of this arm is connected to a cross rail of the cradle by a rod immediately under the plate "D," Fig. 2. The shaft "$b$" is made to revolve by means of shaft "$d$," gears being placed on each, the gear on "$d$" being to the gear on "$b$" as 5 to 7. The pulley "$f$," Fig. 1, on the outer end of shaft "$d$," is driven by a belt from cylinder pulley "$e$," Fig. 1. The crank "$d$" is connected to the lever "$h$," Fig. 2, and by its revolutions causes the hopper to vacillate, a rod passing from the top of lever "$h$" to a cross rail of the hopper, marked "$i$," Fig. 2. The hopper at the outer end is poised on a spring "$j$," Fig. 2, and at its inner end hung in straps, seen at "$k$," Fig. 1. The cradle is hung or supported at the inner end by iron rods and at the outer end by straps "$l$," Fig. 1, made of leather or other flexible material. The length of shake given to either cradle or hopper may be adjusted at pleasure by means of the different holes in the circular cranks.

The movable toe "$m$," Fig. 1, serves the purpose of a trip and can be varied to any irregularity in the floor where the machine is set, and when the machine is being moved it may be pressed up on the leg of the mill and fastened there by a thumb-screw, thus making the back part of the machine less liable to injury in transportation.

We do not claim as our invention the toothed cylinder or thresher, with its corresponding toothed concave; nor do we claim either of the devices herein described, separately; but

We claim—

The combination of an oscillating cradle H of slanting slat or blind work as with set forth, with the two blowers M and Q, and the fender E, substantially in the manner and for the purpose set forth in the specification.

JOSIAH TURNER.
W. C. STUROC.

Witnesses:
JOHN HOPKINS,
I. W. STANTON.